United States Patent [19]

Alyanak

[11] 3,829,218

[45] Aug. 13, 1974

[54] METHOD OF SPECTRAL ANALYSIS

[75] Inventor: Edward J. Alyanak, Mishawaka, Ind.

[73] Assignee: The Bendix Corporation, South Bend, Ind.

[22] Filed: June 5, 1972

[21] Appl. No.: 259,636

[52] U.S. Cl.................... 356/74, 356/77, 356/98
[51] Int. Cl............................................. G01j 3/38
[58] Field of Search........... 250/43.5 R; 356/51, 74, 356/83, 84, 96–98; 350/96 B

[56] References Cited
UNITED STATES PATENTS

| | | | |
|---|---|---|---|
| 2,866,899 | 12/1958 | Busignies et al.................. | 356/98 X |
| 3,100,264 | 8/1963 | Jaffe et al......................... | 356/96 X |
| 3,504,975 | 4/1970 | White.................................. | 356/83 |
| 3,535,537 | 10/1970 | Powell.......................... | 350/96 B X |

Primary Examiner—Ronald L. Wibert
Assistant Examiner—F. L. Evans
Attorney, Agent, or Firm—Leo H. McCormick, Jr.; William N. Antonis

[57] ABSTRACT

A method of simultaneously locating and identifying a plurality of materials within a field of view by comparing the spectral characteristics obtained from systematically scanning the field of view with known spectral signatures of the same materials stored in a memory bank. The number of times a known material is identified as being in the field of view is recorded and referenced to a base. The spectral signatures in the memory bank are continually updated in response to spectral conditions obtained from scanning the field of view.

8 Claims, 3 Drawing Figures

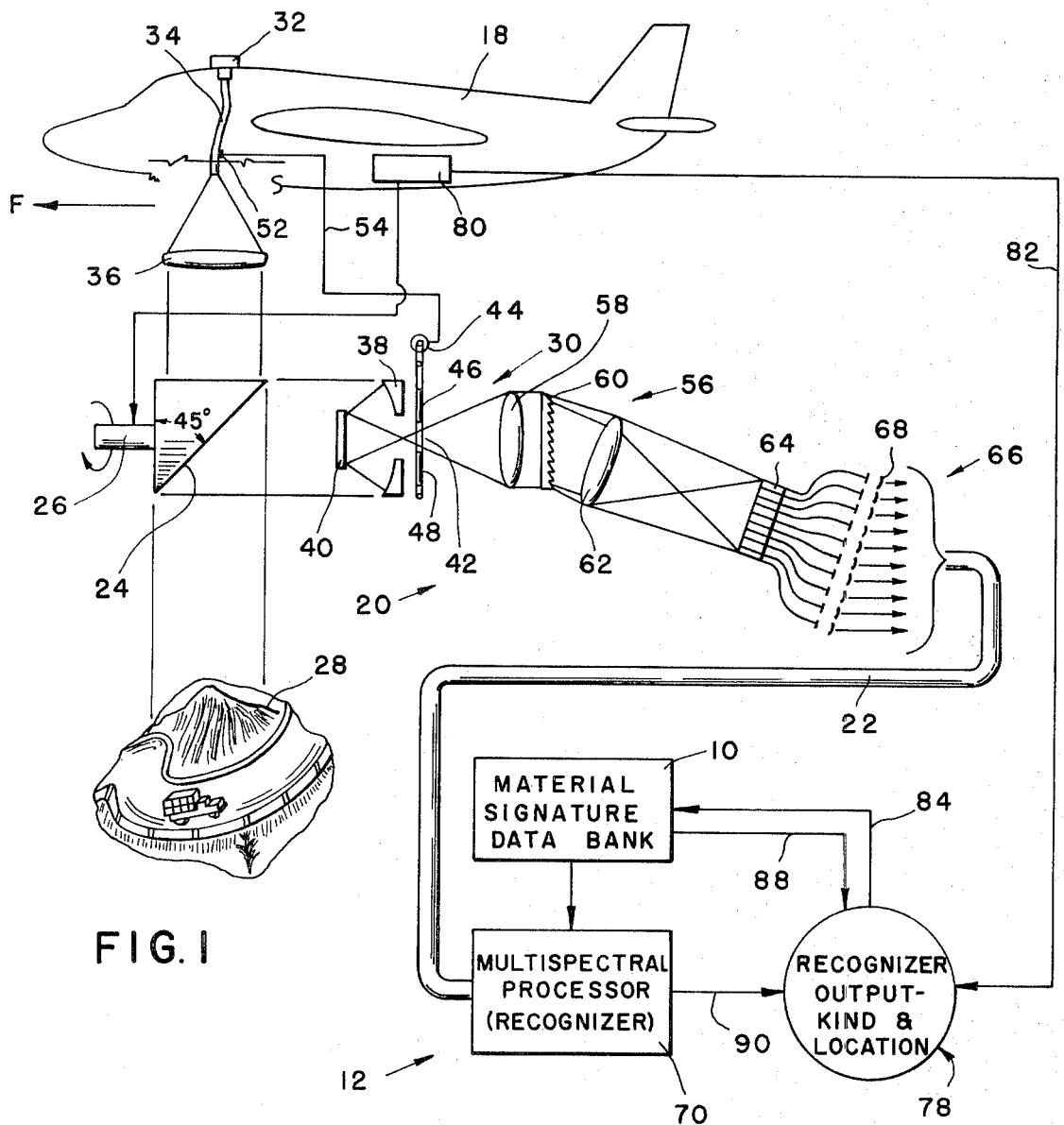
FIG. 1
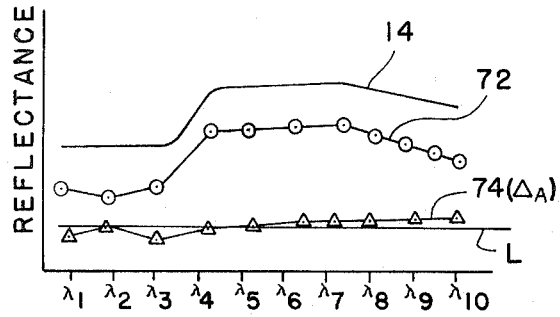
FIG. 2 WAVE LENGTH
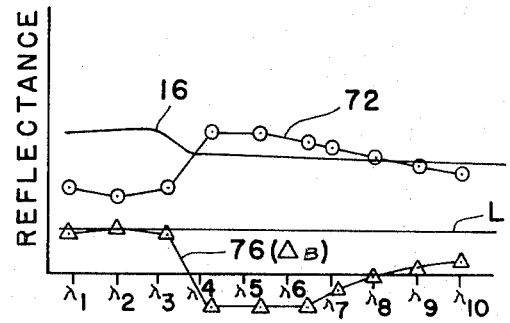
FIG. 3 WAVE LENGTH

3,829,218

METHOD OF SPECTRAL ANALYSIS

BACKGROUND OF THE INVENTION

In the past, aerial observation of an area was achieved by taking photographs at a high altitude. Normally, the camera was continually running and thereby necessitated several reels of film in order to obtain a continuous recorded image. After the film was exposed and developed, many hours of study were required to evaluate the various structures and materials photographed. The time involved from photographing to evaluation during changing conditions often times made the result originally obtained obsolete.

Later a method of spectral discrimination was developed wherein variations in reflected energy from an object sensed by a scanner were compared to the known wavelength of reflectance for the object. The reflected energy was divided into a plurality of video voltages corresponding to channels of a spectrometer.

The video voltages supplied to the channels, which varied as a function of time, were continually compared to a known video voltage for the object, non-varying, in the corresponding channel. The absolute value of the difference between the two voltages was determined. The absolute value differences were added together and compared to the following equation:

$$\sum_{n=1}^{K} 1 \ V_N(+) - V_N \ 1 \ \begin{cases} \leq \epsilon \text{ object present} \\ \geq \epsilon \text{ object present} \end{cases}$$

where $V_N(+) = N^{th}$ channel video voltage
$V_N = N^{th}$ channel known voltage
$\epsilon$ = threshold level and
$K \leq$ the number of channels In differentiating the objects from the background many elements induced as camouflage will produce an absolute value of voltages which indicate the presence of the objects. A similar result occurs when the illumination of the objects varies rapidly between the successive scans.

SUMMARY OF THE INVENTION

It is recognized that each particular element or object possesses a distinct spectral signature resulting from its ability to reflect light. The spectral signature characteristics will be essentially the same regardless of the intensity by which the particular object is illuminated. These spectral characteristics are broken up into a plurality of wavelengths and are transported to a detector means. Signals from the detector means are sent to an analyzer where an unknown spectral signature is created. The unknown spectral signature is compared with known spectral signatures in a memory means. Whenever an unknown spectral signature is identified as a known spectral signature in the memory means, indication is presented identifying the object. During scanning with changes in spectral conditions, the spectral signatures in the memory means is updated to maintain an accurate comparison for determining if the selected objects are located within the field of view.

It is therefore the object of this invention to provide a method of determining the appearance and location of objects within a field of view by comparing known spectral signatures of the objects with spectral characteristics obtained from scanning the field of view.

It is still another object of this invention to provide a method of matching known spectral signatures with spectral characteristics obtained through scanning to locate selected objects within a field of view.

It is still a further object of this invention to provide a method of identifying an object by comparison of spectral characteristics over a plurality of wavelengths with a known spectral signature of the object.

These and other objects of this invention will become apparent from reading this specification and viewing the drawings.

BRIEF DESCRIPTION OF THE DRAWINGS

FIG. 1 is a schematic view of a multispectral sensor means scanning a scene to obtain spectral characteristics within a field of view for comparison with a known spectral signature in a multispectral processor to give a visual indication of selected elements or objects within the scene.

FIG. 2 is a comparison of an unidentified spectral characteristic with a first known spectral signature.

FIG. 3 is a comparison of the unidentified spectral characteristic with a second known spectral signature.

DETAILED DESCRIPTION OF THE PREFERRED EMBODIMENT

The spectral signature of each element and object is separate and distinct. A plurality of these spectral signatures are obtained and stored in a memory bank 10 of an analyzer means 12 shown in FIG. 1. Spectral signatures are obtained by plotting the reflectance of an element produced over a range of wavelengths during a substantially stable period of illumination. Typical spectral signatures are represented for a material A by line 14 in FIG. 2 and a material B by line 16 in FIG. 3.

The analyzer or multispectral processor means 12 is located in an aircraft 18 and joined to a multispectral sensor means 20 by an operational cable 22. The multispectral sensor means 20 is located along the bottom of the fuselage of the aircraft 18.

The multispectral sensor means 20 includes a mirror 24 located at an angle substantially 45° to a shaft 26. The shaft 26 is positioned to be parallel to the line of flight F of the aircraft 18. The shaft 26 is driven through an angle of rotation by a motor (not shown) whose speed is synchronized to be directly proportional to the speed of the aircraft 18. Substantially the same intensity of illumination that falls upon a field of view 28 will be transferred to the mirror 24 through biconvex lens 36 from a fiber optic bundle 34 attached to an opal glass 32 located on the top of the fuselage. As the aircraft 18 moves along the line of flight F, the mirror is rotated and will scan a scene in the field of view perpendicular to the line of flight F. As the scene is scanned the spectral characteristics thereof are reflected along a path to a lens array means 30.

The lens array means 30 includes a plano-concave lens 38 which receives or collects and divergently directs the reflected spectral characteristics to a reflecting element 40. The reflecting element 40 transfers the spectral characteristics through an entrance slot or aperture 42. The size of the entrance slot 42 is controlled by a motor 44 which moves the blades 46 and 48 in response to an operational switch 50 on the motor 44. The operational switch 50 is operated by a light responsive detector 52 (variable photo electrical cell) which sends an operational signal along lead 54 to switch 50. Upon passing through the entrance slot 42, the reflected spectral characteristics enter a spectrographic means 56.

The spectrographic means 56 includes a first biconvex lens 58 which receives the spectral characteristics and convergently directs them to a dispensing prism 60. The dispensing prism 60 will break up the same frame of reflected spectral characteristics into a plurality of wavelengths which are focussed by a second biconvex lens 62 into a fiber optical array 64. The fiber optical array 64 transports or relays the plurality of wavelength to a detector means 66.

The detector means 66 consists of a plurality of photoelectric elements 68 each designed to receive only one of the plurality of wavelengths transported by the fiber optical array 64. Each of the photoelectric elements 68 is connected to a processor means 70 of the analyzer means 12. Each of the photoelectrical elements sends an operational signal to the processor means through the operational cable 22. The processor means 70 receives the operational signal for each of the photoelectrical elements and initially establishes an unidentified spectral signature "$x$" such as represented by line 72 shown in FIGS. 2 and 3 showing values of reflectance over a desired range of wavelengths. The processor means 70 compares the unidentified spectral signature with the signature in the memory means 10 by substracting the unidentified spectral signature "$x$" from each of the known spectral signatures in the memory means 10 to establish an operational signature $\Delta$ line with each known spectral signature such as $\Delta_A$ designated by line 74 in FIG. 2 and $\Delta_B$ designated by line 76 in FIG. 3. A means line L is established for each of the signature $\Delta$ lines. The sum of the squares about the means line, such as $\Delta_A$ for FIG. 2 and $\Delta_B$ for FIG. 3, are compared for each of the known spectral signatures in the memory means according to the following formula:

$$(1) \quad S_s = \sum_{i=1}^{N} (\Delta_i - \overline{\Delta})^2$$

where $\Delta_i$ = the established operational signature $\Delta$ line for each wavelength $\overline{\Delta}$ = the means of the operational signature $\Delta$ line for each wavelength The unidentified spectral signature and the known spectral signature which are compared and produce the lowest value for $S_s$ provide an identification of the material or object. This indicates that the known spectral signature in the memory means 10 has the highest correlation with the unidentified spectral signature "$x$," since a value of $S_s = 0$ means that the curves are identical except for a vertical shift in reflectance. For practical purposes since noise and mechanical factors enter into the obtaining of the spectral signature, if the processor means 70 initially obtains an $S_s$ within designed limits the unidentified spectral signature will be identified with a known spectral signature in the memory bank 10. Therefore once an unidentified spectral signature is initially identified, a secondary confirmation is required. In our example, as between material A in FIG. 2 and material B in FIG. 3, the processor 70 would select material A as being identical with the unidentified spectral signature $x$. In the confirmation it will be noted that between $x_3$ and $x_4$ of the known spectral signature of substantial positive incremental increase is present. If the unidentified spectral signature "$x$" does not also possess this same positive increment than initial identification is rejected. However, in our example in FIG. 2, between $x_3$ and $x_4$ line 72 does possess a positive incremental increase as does line 14 positively identifying the previously unidentified spectral signature with that of material A in the memory bank 10.

Upon positively identifying the material A as being in the scanned field of view, an identification signal is sent to an output means 78.

The output means 78 can consist of either an oscillograph or digital printer having an input through line 88 from the memory means 10 identifying the known signatures stored therein to correspondingly match the identification signal sent on line 90 from the processor 70. A directional input from navigational control means 80 which corresponds to the line of flight F and location of the mirror 24 with respect thereto is carried on line 82 to the output means. Upon positively identifying material A, for example, in the field of view, the output means can now give a visual indication and location through $x$-$y$ coordinates off the line of flight F.

Whenever it is desired to observe an area for a length of time and spectral conditions change during the scanning period as exemplified through repeated comparison of materials within the memory as being slightly out of phase or reflectance intensity, the output means 78 will send updating information through connection 84 to the memory means 10. The change in spectral condition could occur for example through heat waves, high humidity, haze, etc. However, since the spectral signatures in the memory means 10 will be continually updated, positive identification is assured. The updating is made dynamically so that large amounts of data need not be saved to provide a weighted average. Thus, changes in terrain are automatically compensated for without modification to the analyzer means 12.

It is visualized that the output means 78 could also be a camera whose recording operation is triggered by the identification signal sent from the processor 70. Thus, a permanent video record of the identification could be scrutinized more closely at a later period.

Additionally, it is also visualized that an ordered set of data such as obtained from a voice print could be reduced to a series of ordered signals and processed to create an unidentified curve signature. This unidentified curve signature could then be compared in a library of known voice prints. From this comparison the voice print could be analyzed to determine if a match is present in the library. If a match exists, a display with known vital information from the library could then be transferred to a readout device. Such a device would be a valuable aid to law enforcement officials in solving crimes where a telephone is used in an extortion attempt.

I claim:

1. A method of identifying and locating a plurality of materials within a field of view by simultaneously comparing the spectral characteristics of the field of view through a number of selected wavelengths with reference spectral signatures of said plurality of materials, comprising the steps of:

scanning said field of view to obtain said spectral characteristics;

relaying the scanned spectral characteristics to a focusing lens array;

dispersing said scanned spectral characteristics by said focusing lens array into a plurality of wavelengths, transporting said plurality of wavelengths to a detector means;

sending a series of signals representative of said plurality of wavelengths from said detector means to an analyzer means;

processing said series of signals by said analyzer means to create an unidentified spectral signature extending over the entire number of selected wavelengths;

comparing said unidentified spectral signatures with said reference spectral signatures;

indicating through output means when said unidentified spectral signature substantially matches a reference spectral signature from said plurality of materials within the scanned field of view;

confirming the matches through an incremental segment mathematical characteristic in said selected wavelengths; and providing a visible signal upon said match being confirmed.

2. The method, as recited in claim 1 further comprising the steps of:

printing a tabulation of said matches in the scanned field of view; and referencing said matches to a set of known x-y coordinate within said field of view.

3. The method, as recited in claim 2 further comprising the steps of:

modifying said reference spectral signatures in response to spectral conditions within the field of view as determined upon comparison with said unidentified spectral signatures.

4. A method of locating a plurality of materials within a field of view through spectral characteristics recognized by a multi-spectral processor comprising the steps of:

scanning the field of view to obtain said spectral characteristics by sequentially moving a variably controlled rotating mirror through the field of view at a speed to provide a predetermined overlap for successive scans, said rotating mirror being located in a plane substantially 45° to the axis of rotation;

reflecting the spectral characteristics of each scan by the rotating mirror along a path to lens means, said lens means diverging and directing the spectral characteristics through a spectrograph;

breaking the spectral characteristics into a selected number of wavelengths while in said spectrograph;

focusing said selected number of wavelengths on a bundle of light carrying rods, said rods relaying the selected number of wavelengths to a detector means, said detector means receiving the selected wavelengths;

sending a series of operational signals representative of said selected wavelengths to an analyzer means;

processing said series of operational signals by said analyzer means to create an unidentified spectral signature extending over the entire selected wavelengths;

comparing said unidentified spectral signature with a plurality of known spectral signatures of materials stored in a memory means;

indicating through an output means when said unidentified spectral signature coincides with one of said plurality of known spectral signatures confirming the coincidence through an incremental segment mathematical characteristic in said selected wavelength of the known spectral signature; and providing a visible signal upon said coincidence being confirmed.

5. The method, as recited in claim 4 further comprising the steps of:

referencing the number of times materials of the known spectral signatures are identified as being in the field of view to a base; and printing a tabulation of the location from the base of said materials.

6. The method, as recited in claim 5 further comprising the steps of:

updating the spectral signature in the memory means in response to changes in spectral conditions exhibited upon lens compared with the scanned spectral characteristics.

7. A method of identifying and locating a plurality of materials within a field of view by comparing the spectral characteristics of the field of view at different wavelengths with reference spectral signatures of said plurality of materials, comprising the steps of:

presenting a series of signals representative of the spectral characteristics of an unidentified object to an analyzer means;

processing said series of signals by said analyzer means to create an unidentified spectral signature the entire selected wavelength;

comparing said unidentified spectral signatures with said reference spectral signatures;

suggesting through an output means when said unidentified spectral signature substantially matches a reference spectral signature from said plurality of materials within the scanned field of view;

confirming the matches through an incremental segment mathematical characteristic to positively identify the unidentified spectral signature; and referencing the matches on a coordinate system to locate the object within the field of view.

8. A method of identifying an unidentified ordered set of data by comparing curve characteristics with a library set of curves, comprising the steps of:

presenting a series of signals representative of the unidentified ordered set of data to an analyzer means;

processing said series of signals by said analyzer means to create an unidentified curve signature extending over the entire spectral wavelength;

comparing said unidentified curve signature with said library;

suggesting through output means when said unidentified curve signature substantially matches a curve in said library;

conforming said matches through an incremental mathematical characteristic to positively identify the curve signature; and providing a visible display upon said match being confirmed.

* * * * *